(12) United States Patent  (10) Patent No.: US 6,788,666 B1
Linebarger et al.  (45) Date of Patent: Sep. 7, 2004

(54) HYBRID FIBER WIRELESS COMMUNICATION SYSTEM

(75) Inventors: John William Linebarger, Overland Park, KS (US); Durga P. Satapathy, Lawrence, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 924 days.

(21) Appl. No.: 09/592,698

(22) Filed: Jun. 13, 2000

(51) Int. Cl.[7] .......................... H04Q 7/24; H04L 12/66; H04L 12/28; H04B 7/212

(52) U.S. Cl. ..................... 370/338; 370/352; 370/395.1; 370/442; 398/66

(58) Field of Search ................................ 370/338, 352, 370/395.1, 347, 225, 228, 400, 401, 467, 468, 442; 398/68, 58, 89, 66; 455/524, 500

(56) References Cited

U.S. PATENT DOCUMENTS 5,682,256 A * 10/1997 Motley et al. .............. 359/117
6,111,863 A * 8/2000 Rostoker et al. ............ 370/329
6,226,111 B1 * 5/2001 Chang et al. ................ 359/119
6,490,273 B1 * 12/2002 DeNap et al. ............... 370/352
6,674,966 B1 * 1/2004 Koonen ....................... 398/70

* cited by examiner

Primary Examiner—Duc Ho

(57) ABSTRACT

A communication system comprises a central service node, a plurality of base stations, and a fiber network. The central service node is configured with a baseband data system, a central RF system, and a central optical system. The base stations are each configured with a base station optical system, a base station RF system, and a base station transceiver system. The baseband data system in the central service node processes baseband data. The central RF system converts the baseband data into electronic RF data. The central optical system converts the electronic RF data into optical RF data. The fiber network exchanges the optical RF data between the central service node and the base stations. The base station optical system converts the optical RF data into the electronic RF data. The base station RF system modifies frequencies of the electronic RF data. The base station transceiver system converts the electronic RF data into wireless RF data and exchanges the wireless RF data over an air interface with customer premise equipment.

24 Claims, 5 Drawing Sheets

| BASEBAND DATA | RF FREQUENCY (MHz) | WIRELESS SERVICE |
|---|---|---|
| ATM, IP | 100 – 500 | MMDS |
| T1, T3 | 500 – 1000 | LMDS |
| CDMA | 1000-1500 | PCS |
| ANY | 1500-2000 | UNLICENSED |
| ANY | 2000-2500 | OPEN |

FIG. 4

| WAVELENGTH | FROM | TO | TYPE |
|---|---|---|---|
| 1 | CENTRAL NODE 110 | BASE STATION 120 | WORK |
| 2 | CENTRAL NODE 110 | BASE STATION 120 | PROTECT |
| 3 | CENTRAL NODE 110 | BASE STATION 130 | WORK |
| 4 | CENTRAL NODE 110 | BASE STATION 130 | PROTECT |
| 5 | CENTRAL NODE 110 | BASE STATION 140 | WORK |
| 6 | CENTRAL NODE 110 | BASE STATION 140 | PROTECT |
| 7 | BASE STATION 120 | CENTRAL NODE 110 | WORK |
| 8 | BASE STATION 120 | CENTRAL NODE 110 | PROTECT |
| 9 | BASE STATION 130 | CENTRAL NODE 110 | WORK |
| 10 | BASE STATION 130 | CENTRAL NODE 110 | PROTECT |
| 11 | BASE STATION 140 | CENTRAL NODE 110 | WORK |
| 12 | BASE STATION 140 | CENTRAL NODE 110 | PROTECT |

FIG. 5

HYBRID FIBER WIRELESS COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a hybrid fiber wireless communication system that transfers Radio Frequency (RF) signals.

2. Description of the Prior Art

Baseband data services that carry voice, video, and data are experiencing strong growth. Some examples of baseband data services include Asynchronous Transfer Mode (ATM), Internet Protocol (IP), Code Division Multiple Access (CDMA), and Time Division Multiplex (TDM). Baseband data services are provided by systems such as ATM switches, IP routers, and Synchronous Optical Network (SONET) multiplexers.

Wireless services that carry voice, video, and data are also experiencing enormous growth. Some examples of wireless services include Microwave Multi-point Distribution System (MMDS), Local Multi-point Distribution System (LMDS), Personal Communications Services (PCS), and the use of unlicensed spectrum. These wireless services use signals in the RF range. To convert baseband data into RF data, the baseband data is modulated with a carrier frequency to up-convert the baseband data into the RF range.

Wireless communication systems often use a fiber network to transfer data from wireless base stations to land-based networks. When the wireless communication system offers baseband data services, the base stations require baseband equipment, such as ATM switches, IP routers, and Synchronous Optical Network (SONET) multiplexers. As baseband data services grow, so does the cost and complexity of the baseband data equipment in the base stations.

Base stations often face severe floor space restrictions, and baseband data equipment takes up valuable space. The baseband data equipment also requires increased power and security. More importantly, the base stations require skilled data technicians to test and maintain the baseband data systems. Baseband data technicians typically require more training and compensation than RF technicians. Inevitably, expensive and complex baseband data equipment is under-utilized in some base stations. This represents a tremendous waste of baseband data equipment and technicians.

Hybrid Fiber Coax (HFC) communication systems were developed in the 1980's to deliver broadband video to residential areas. In a typical HFC system, a central node converts analog and digital video to optical RF signals. A fiber network then distributes the optical RF signals from the central node to various fiber optic nodes in the residential area. The fiber optic nodes convert the optical RF signals to electronic RF signals. Coaxial cable then transfers the electronic RF signals to the residences. Unfortunately, the coaxial cable place a bandwidth limitation on the system at less than 900 MHz. In addition, HFC systems were designed for broadcast video services and not for a continually changing group of wireless services.

SUMMARY OF THE INVENTION

The invention solves the above problems with a Hybrid Fiber Wireless (HFW) communication system performs baseband data processing and provides multiple wireless services. The HFW system has greater bandwidth than prior hybrid fiber coax systems. The hybrid fiber system is cheaper and less complex than other wireless communication systems that perform baseband data processing.

Advantageously, baseband data equipment is concentrated in a central service node that exchanges optical RF data with the base stations. The optical RF data is exchanged using multiple add-drop points. The communication path between the central service node and the customer premise equipment uses mainly passive components. Thus, the base stations are greatly simplified to save maintenance costs and floor space. The concentration of baseband equipment in a central service node allows for more efficient utilization of equipment, support systems, and data technicians. For example, base stations would need less floor space, power, and air conditioning.

The HFW communication system comprises a central service node, a plurality of base stations, and a fiber network. The central service node is configured with a baseband data system, a central RF system, and a central optical system. The base stations are each configured with a base station optical system, a base station RF system, and a base station transceiver system. These systems are configured to operate as follows.

The baseband data system in the central service node processes baseband data. The central RF system up-converts the baseband data into electronic RF data. The central optical system converts the electronic RF data into optical RF data. The fiber network exchanges the optical RF data between the central service node and the base stations. The base station optical system converts the optical RF data into the electronic RF data. The base station RF system modifies frequencies of the electronic RF data. The base station transceiver system converts the electronic RF data into wireless RF data and exchanges the wireless RF data over an air interface with customer premise equipment.

BRIEF DESCRIPTION OF THE DRAWINGS

The same reference number represents the same element on all drawings.

FIG. 4 is a table diagram that illustrates conversion between baseband data and RF data in an example of the invention.

FIG. 5 is a table diagram that illustrates optical RF data transmission in an example of the invention.

DETAILED DESCRIPTION OF THE PREFERRED EMBODIMENT

FIGS. 1–5 depict a specific example of a communication system in accord with the present invention. Those skilled in the art will appreciate numerous variations from this example that do not depart from the scope of the invention. Those skilled in the art will appreciate that various features described below could be combined to form multiple variations of the invention. Those skilled in the art will also appreciate that some conventional aspects of FIGS. 1–5 have been simplified or omitted for clarity.

Figure 1:
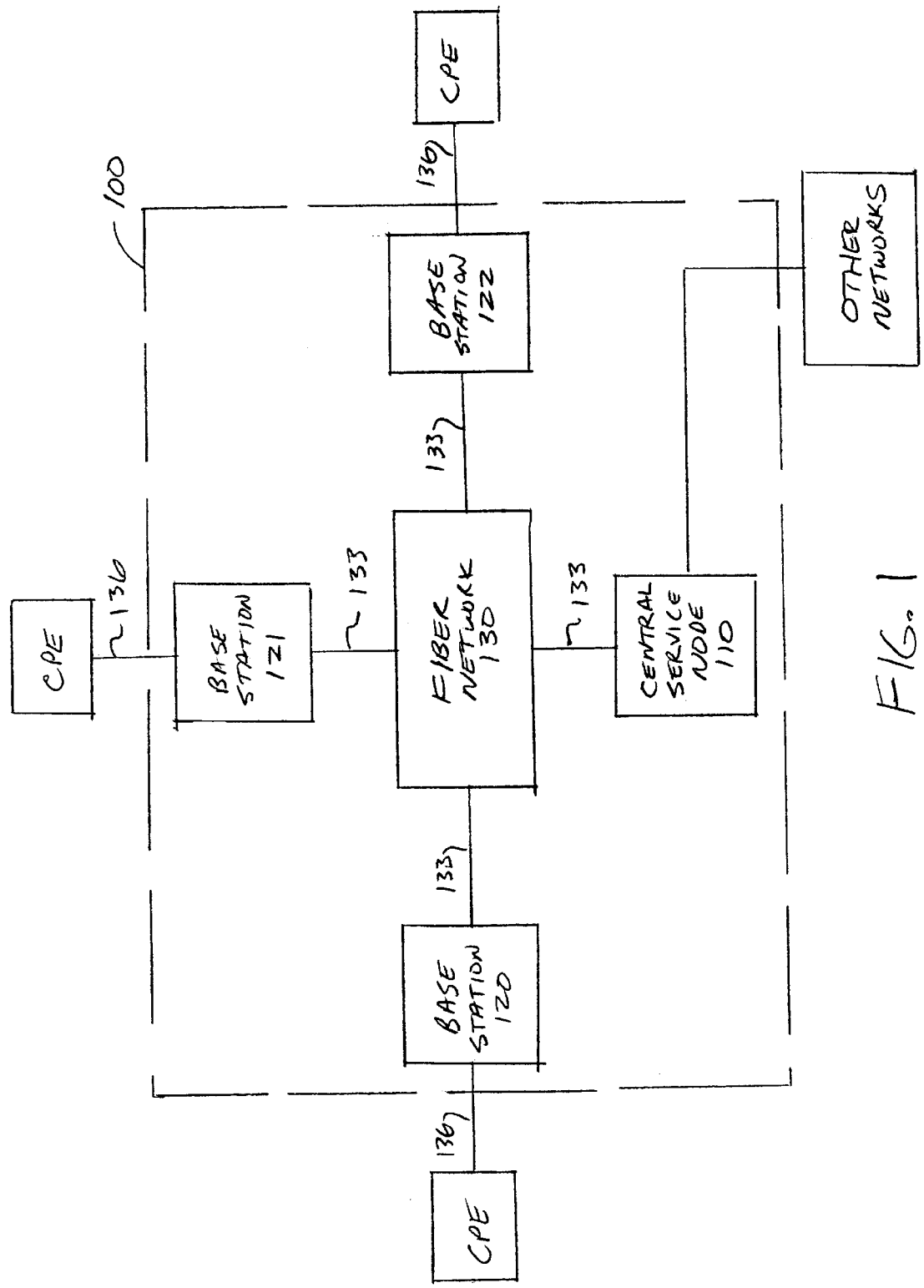
FIG. 1 is a block diagram that illustrates a communication system in an example of the invention.

FIG. 1 illustrates communication system 100 in an example of the invention. Communication system 100 comprises central service node 110, base stations 120–122, and fiber network 130. Central service node 110 communicates with other networks, such as the Internet or Public Switched Telephone Network. Base stations 120–121 communicate with Customer Premise Equipment (CPE) over the air interface. Fiber network 130 comprises optical fibers, such as single mode fiber, that interconnect central service node 110 with base stations 120–122.

Figure 2:
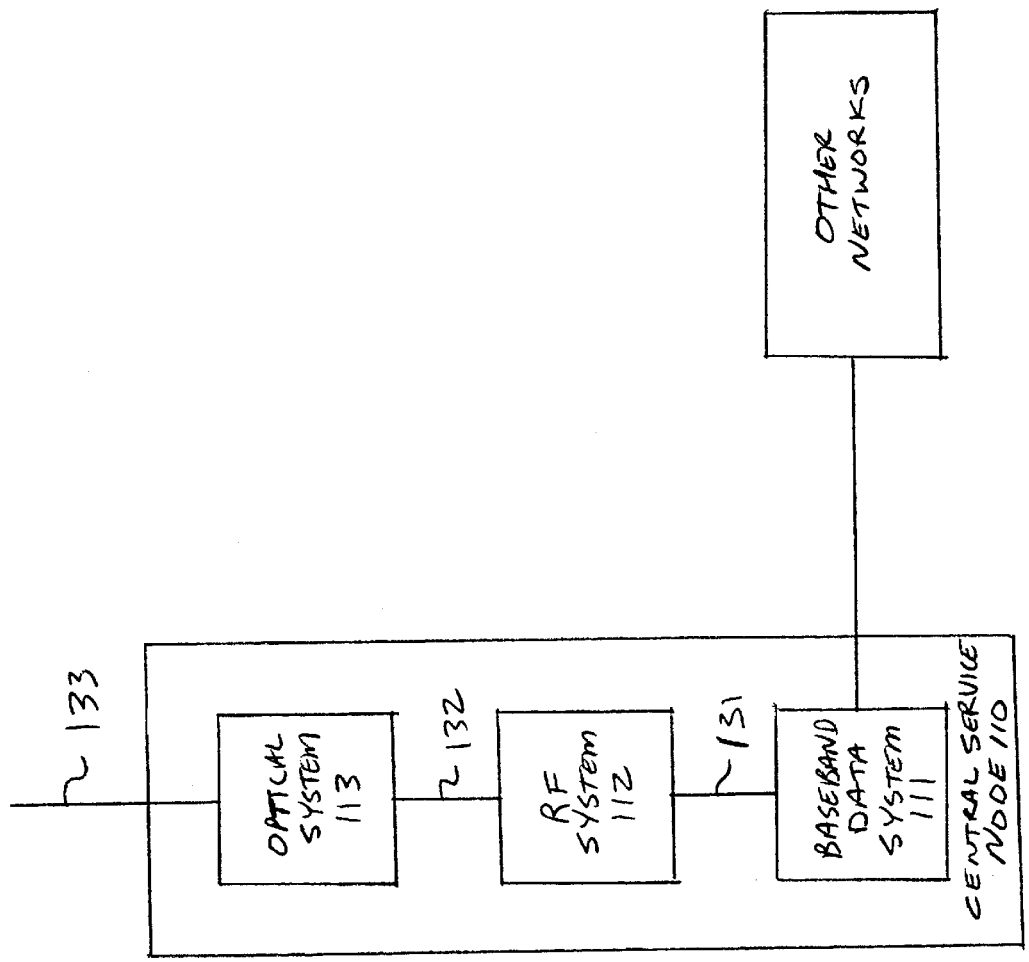
FIG. 2 is a block diagram that illustrates a central service node in an example of the invention.

FIG. 2 illustrates central service node 110 in an example of the invention. Central service node 110 comprises baseband data system 111, RF system 112, and optical system 113. Optical system 113 is coupled to fiber network 130 and RF system 112. RF system 112 is coupled to baseband data system 111. Baseband data system 111 communicates with the other networks. Examples of baseband data system 111 include ATM switches, IP routers, TDM devices, servers, computers, and other data devices.

Figure 3:
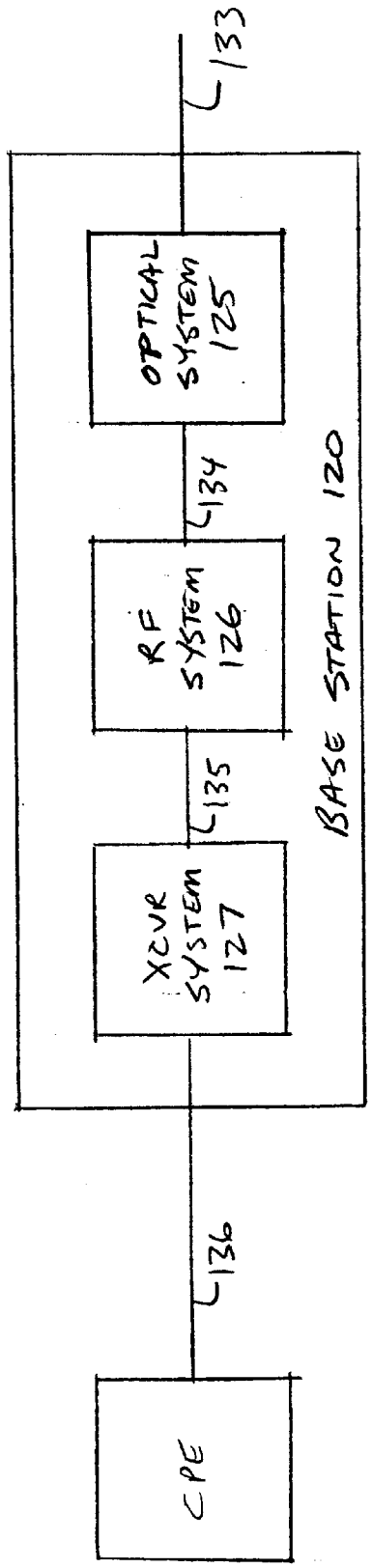
FIG. 3 is a block diagram that illustrates a base station in an example of the invention.

FIG. 3 illustrates base station 120 in an example of the invention, and base stations 121–122 are similar. Base station 120 comprises optical system 125, RF system 126, and transceiver system 127. Optical system 125 is coupled to fiber network 130 and RF system 126. RF system 126 is coupled to transceiver system 127. Transceiver system exchanges wireless RF data 136 with CPE over the air interface.

Advantageously, base stations 120–122 do not need any baseband data processing equipment because all baseband data processing, such as ATM switching and IP routing, occurs in the central service node 110. Thus, base stations 120 are greatly simplified to save maintenance costs and floor space. The concentration of baseband data systems 111 in central service node 110 allows for more efficient utilization of equipment, support systems, and data technicians.

Referring to FIGS. 1–3, baseband data system 111 processes and transfers baseband data 131 to RF system 112. RF system 112 converts baseband data 131 into electronic RF data 132 and transfers electronic RF data 132 to optical system 113. Optical system 113 converts electronic RF data 132 into optical RF data 133 and transfers optical RF data 133 to base stations 120–121 over fiber network 130.

Optical system 125 converts optical RF data 133 into electronic RF data 134 and transfers electronic RF data 134 to RF system 126. RF system 126 modifies the RF frequencies of electronic RF data 134 to produce electronic RF data 135. RF system 126 transfers electronic RF data 135 to transceiver system 127. Transceiver system 127 converts electronic RF data 135 into wireless RF data 136 and exchanges wireless RF data 136 over the air with CPE.

The frequency modification by RF system 126 converts a first block of frequencies to a second block of frequencies. For example, frequency block $f_1$ to $f_4$ may become frequency block $f_5$ to $f_8$. Passive electronic components may be used to perform the frequency modification.

In the opposite direction, transceiver system 127 converts wireless RF data 136 to electronic RF data 135 and transfers electronic RF data 135 to RF system 126. RF system 126 modifies the RF frequencies of electronic RF data 135 to produce electronic RF data 134. RF system 126 transfers electronic RF data 134 to optical system 125. Optical system 125 converts electronic RF data 134 into optical RF data 133 and transfers optical RF data 133 to central service node 110 over fiber network 130. Optical system 113 converts optical RF data 133 into electronic RF data 132 and transfers electronic RF data 132 to RF system 112. RF system 112 converts electronic RF data 132 into baseband data 131 and transfers baseband data 131 to baseband data system 111. Baseband data system 111 processes baseband data 131 and communicates with other networks.

Central service node 110 handles baseband data processing, such as data caching, server access, ATM switching, IP routing, and TDM processing. Central service node 110 converts between baseband data and optical RF data, so the RF data can be passively transferred to base stations 120–122 in the optical domain. Base stations 120–122 may passively process and exchange the RF data with CPE using various wireless services or combinations of wireless services.

FIG. 4 illustrates the correlation between baseband data, RF data, and wireless services in an example of the invention. Note that FIG. 4 is an example that is intended to teach inventive principles to those skilled in the art—the values and correlations listed on FIG. 4 may vary in other examples of the invention. In the context of the invention, the RF range is between 100 Mhz and 2500 Mhz. ATM and IP baseband data are converted into RF data in the frequency range of 100–500 MHz and are exchanged with CPE using MMDS. T1/T3 baseband data is converted into RF data in the frequency range of 500–1000 MHz and is exchanged with CPE using LMDS. CDMA baseband data is converted into RF data in the frequency range of 1000–1500 MHz and is exchanged with CPE using PCS. Any baseband data can be converted into RF data in the frequency range of 1500–2000 MHz and can be exchanged with CPE using unlicensed spectrum. Any baseband data can be converted into RF data in the frequency range of 2000–2500 MHz and can be exchanged with CPE using various wireless services. If desired, the above frequency ranges may be channelized for their respective wireless service.

Optical RF data 133 is exchanged between central service node 110 and base stations 120–122. Some technique is required to route optical RF data 133 between central service node 110 and the desired one of the base stations 120–122. In some examples of the invention, optical systems 113 and 125 use dense wave division multiplexing to transfer optical RF data 133 over fiber network 130. In some cases, each wavelength carries one GHz of RF bandwidth that contains over one hundred 64 quadrature amplitude modulated channels.

Each one of the base stations 120–122 is assigned a unique set of at least four wavelengths: 1) a working transmit wavelength, 2) a protect transmit wavelength, 3) a working receive wavelength, and 4) a protect receive wavelength. Corresponding work and protect wavelengths propagate around opposite sides of a fiber ring between the transmitting system and the receiving system. If the working wavelength fails, possibly due to a fiber cut, then the protect wavelength is used. Thus wavelength assignments are used to transfer optical RF data 133 between central service node 110 and the desired one of the base stations 120–122. If desired, broadcast wavelengths may be established that are received by all base stations.

FIG. 5 illustrates optical RF data transmission using wavelength assignments in an example of the invention.

Each wavelength carries all or part of the RF data described with respect to FIG. 4. Note that FIG. 5 is an example that is intended to teach inventive principles to those skilled in the art—the values and correlations listed on FIG. 5 may vary in other examples of the invention. The transmitting system uses the wavelength that is assigned to the desired receiving system when transferring optical RF data 133 to the desired receiving system. The desired receiving system selects the RF optical data 133 that is intended for them by passively filtering their assigned wavelength. Passive components, such as Bragg diffraction gratings, can be used to implement the abovedescribed wavelength routing technique. If desired, fiber network 130 can also transfer optical baseband data, such as IP or ATM over SONET, between central service node 110, base stations, 120–122, and other systems Those skilled in the art will appreciate variations of the above-described embodiments that fall within the scope of the invention. As a result, the invention is not limited to the specific examples and illustrations discussed above, but only by the following claims and their equivalents.

We claim:

1. A communication system comprising:
    a central service node configured with baseband data system, central Radio Frequency (RF) system, and central optical system, wherein the baseband data system is configured to process baseband data, the central RF system is configured to convert the baseband data into electronic RF data, and the central optical system is configured to convert the electronic RF data into optical RF data;
    a plurality of base stations wherein each base station is configured with base station optical system, base station RF system, and base station transceiver system, wherein the base station optical system is configured to convert the optical RF data into the electronic RF data, the base station RF system is configured to modify frequencies of the electronic RF data, and the base station transceiver system is configured to convert the electronic RF data into wireless RF data and exchange the wireless RF data over an air interface with customer premise equipment; and
    a fiber network coupled to the central service node and the base stations and configured to exchange the optical RF data between the central service node and the base stations.

2. The communication system of claim 1 wherein the central optical system, the base station optical system, and the fiber network are configured to use wave division multiplexing to exchange the optical RF data.

3. The communication system of claim 2 wherein the central optical system and the base station optical system are configured to use base station wavelength assignments to exchange the optical RF data with the fiber network.

4. The communication system of claim 1 wherein the fiber network is configured with a work path and a protect path between the central service node and each base station.

5. The communication system of claim 1 wherein at lease some of the base station transceivers exchange the wireless RF data to provide Microwave Multi-point Distribution System service.

6. The communication system of claim 1 wherein at least some of the base station transceivers exchange the wireless RF data to provide Local Multi-point Distribution System service.

7. The communication system of claim 1 wherein at lease some of the base station transceivers exchange the wireless RF data to provide Personal Communications Service.

8. The communication system of claim 1 wherein the base stations do not perform baseband data processing on the data.

9. The communication system of claim 1 wherein the central baseband system comprises an internet protocol router.

10. The communication system of claim 1 wherein the central baseband system comprises an asynchronous transfer mode switch.

11. The communication system of claim 1 wherein the central baseband system comprises a time division multiplex device.

12. The communication system of claim 1 wherein the central baseband system is configured to communicate with the Internet and with the Public Switched Telephone Network.

13. A method of operating a communication system, the method comprising:
    in a central service node, processing baseband data with baseband data systems, converting the baseband data into electronic RF data, and converting the electronic RF data into optical RF data;
    in a plurality of base stations, converting the optical RF data into the electronic RF data, modifying frequencies of the electronic RF data, converting the electronic RF data into wireless RF data, and exchanging the wireless RF data over an air interface with customer premise equipment; and
    in a fiber network, exchanging the optical RF data between the central service node and the base stations.

14. The method of claim 13 wherein exchanging the optical RF data comprises using wave division multiplexing.

15. The method of claim 14 wherein exchanging the optical RF data comprises using base station wavelength assignments.

16. The method of claim 13 wherein exchanging the optical RF data comprises using a work path and a protect path between the central service node and each base station.

17. The method of claim 13 wherein exchanging the wireless RF data comprises providing Microwave Multi-point Distribution System service.

18. The method of claim 13 wherein exchanging the wireless RF data comprises providing Local Multi-point Distribution System service.

19. The method of claim 13 wherein exchanging the wireless RF data comprises providing Personal Communications Service.

20. The method of claim 13 wherein the base stations do not perform baseband data processing on the data.

21. The method of claim 13 wherein processing the baseband data comprises internet protocol routing.

22. The method of claim 13 wherein processing the baseband data comprises asynchronous transfer mode switching.

23. The method of claim 13 wherein processing the baseband data comprises time division multiplex processing.

24. The method of claim 13 further comprising, in the central service node, communicating with the Internet and with the Public Switched Telephone Network.

* * * * *